Patented Dec. 30, 1947

2,433,656

UNITED STATES PATENT OFFICE 2,433,656

DISPERSION OF RUBBER IN POLAR ORGANIC LIQUID MEDIA

Charles H. Egan, Belmont, Arthur J. Leydon, Waltham, and Joseph P. Fahey, Cambridge, Mass., assignors to Dewey and Almy Chem'cal Company, North Cambridge, Mass., a corporation of Massachusetts No Drawing. Application May 20, 1939, Serial No. 274,812

In Great Britain June 11, 1938

6 Claims. (Cl. 260—760)

This invention relates to dispersions of rubber in non-aqueous organic liquid media.

The common liquid forms of rubber, so far known, are rubber solutions and aqueous rubber dispersions such as natural or artificial latex.

Both of these have certain disadvantages which restrict their field of use. The hydrocarbon solvents used in forming rubber solutions penetrate the protein envelopes of the rubber particles and swell them to a gigantic size. As a result, solvent cements possess a very high viscosity, yet have a small proportion of total solids. In addition, the solvents frequently cause a depolymerization of the rubber while in solution. Despite the use of anti-oxidants, films deposited from solvent rubber are not as dependable as could be desired and lack the strength which is characteristic of rubber which has not been swollen or distorted. An additional disadvantage in compounding rubber cements is found in the fact that many desirable compounding ingredients have a very limited solubility in the hydrocarbon solvents which are used.

Aqueous dispersions have certain peculiar disadvantages. They are relatively slow to dry. They do not penetrate fibrous masses well unless certain rather expensive precautions be taken, and the water in the dispersion is frequently harmful to the base material on which the dispersion is spread. In addition, the water may hydrate the loading materials used to an undesirable degree.

It is, therefore, the object of this invention to produce dispersions of rubber which are free from the objections set forth. More specifically, this invention has for its object to produce dispersions of rubber in non-aqueous organic liquid media which are non-solvents for rubber. A further object of the invention is to produce an improved can-sealing composition.

Organic liquids may be classified roughly according to whether or not they dissolve rubber and a certain relationship has been found to exist between the chemical structure of the liquid and its solvent effect on rubber.

Strongly polar organic liquids such as the lower aliphatic alcohols, ketones and acids, and certain of the simpler aromatic alcohols and acids, do not have any solvent effect on rubber. On the other hand, they do dissolve cellulose acetate, cellulose nitrate and similar compounds, probably because of the polar nature of these cellulosic derivatives. Compounds containing less active terminal groups, for example, halogen derivatives and ethers, are only weakly polar in nature and do dissolve rubber. The polar liquids are dependent for their characteristic solvent properties upon the polar group contained in their molecule, and the remaining hydrocarbon part of the molecule does not exert any substantial solvent effect. However, as the number of carbon atoms in the molecule becomes greater, for example, on ascending the homologous series for a given type of aliphatic compound, the liquid becomes less polar and tends to behave more and more like a hydrocarbon compound. Eventually a point is reached where the compound is no longer polar and is a strong rubber solvent. The polar aromatic compounds show a similar change in properties when the number of carbon atoms is increased. For example, phenol is a strongly polar liquid and a non-solvent for rubber, but the substitution of alkyl groups in the molecule causes a definite change in polarity, with an increasing effectiveness as a rubber solvent as the size of the alkyl substituent is increased.

We have discovered that it is possible to produce dispersions having rubber as the internal phase and a strongly polar liquid which is a non-solvent for rubber as the dispersing medium, if the rubber is first masticated thoroughly in the presence of a colloidal material which is swellable in the polar liquid, and the liquid dispersing medium is then added, with continued mastication, until the phases invert and a rubber dispersion is formed.

Dispersions produced according to this invention give a broader field of usefulness to dispersed rubber than it has previously possessed since they are free from most of the objections which have been set forth. The polar liquid dispersing medium does not form the high viscosity dispersions characteristic of solvents, nor does it cause the depolymerization of the suspended rubber. The resistance to ageing of rubber deposited from these dispersions compares very favorably with that of water dispersed rubber. Again, contrasted with water dispersions, the films dry very rapidly and possess a superior degree of waterproofness. These dispersions may be used in many situations where the poor wetting of water dispersions creates process difficulties and, in addition, since the polar liquids are recognized as good coupling agents for any two incompatible liquids, the presence of a polar liquid as the continuous phase in the dispersion makes possible a far wider range of liquid additions than has heretofore been possible either with solvent cements or with rubber latex.

Since such dispersions, because of their water resistance, good ageing qualities, rapidity of drying, and the high proportion of rubber solids which they carry, have special adaptability to the sealing of containers, their use as container sealing compounds will be set forth with particularity. It is to be understood, however, that these dispersions are by no means limited to such uses but, as is stated before, find application wherever the water or the rubber solvents previously used create process difficulties.

When one attempts to work a polar liquid, such as ethyl alcohol or benzyl alcohol into rubber, it will be found that the rubber will absorb amounts of alcohol up to about 50%. The rubber, however, remains as the continuous, solid phase, and a dispersion or solution is never formed. If materials which swell violently or dissolve in the alcohol are first added to the rubber, the subsequent addition of alcohol and swelling of the colloidal material has the effect of disrupting the rubber mass and separating the individual particles. If a sufficiently large amount of the colloidal material has been added, the rubber mass is completely broken up, the phases are reversed, and the alcohol becomes the continuous phase.

The following examples are given in order that the process of the invention may be more clearly understood.

Example I

In carrying out the invention, a solution of 300 parts of polymerized vinyl acetate in 200 parts of ethyl alcohol is added to 600 parts of unmilled smoked sheet rubber, and the mixture is milled for 15 to 20 minutes on a conventional rubber mill, the rolls of which are chilled. The mixture is then placed in a steam-jacketed Werner-Pfleiderer mixer and 400 parts of alcohol are added together with 50 parts of water. After the mixing has been continued a few minutes, steam is turned into the jacket of the mixer until the temperature of the mass rises to about 130° F. Small amounts of alcohol are then added from time to time until the total amount of alcohol in the mixture is 900 parts. During the course of this addition, phase reversal takes place and the rubber becomes dispersed in the ethyl alcohol medium.

The step of phase reversal, that is, the conversion of the solid, rubbery mass into a liquid system in which individual rubber particles are dispersed, can be promoted by the use of small amounts of a dispersing agent for the rubber. Such agents aid materially in overcoming the cohesive forces between the rubber particles. When they are used, less mastication of the rubber is necessary, hence the dispersion process is accelerated and less energy is consumed. In addition, the use of dispersing agents makes possible the addition of very much smaller quantities of colloidal material to the rubber. As dispersing or peptizing agents, it is preferred to use both substances as the magnesium salt of tri-isopropyl naphthalene sulphonic acid, ammonium oleate, aluminum soaps, zinc stearate, 28% ammonia, sulphonated alcohols, or other recognized dispersing agents for rubber, particularly those which are easily soluble in the polar organic liquid compounds.

Example II 600 parts of pale crepe or smoked sheets, 300 parts of Loba-A gum and 7.8 parts of Sym. di-beta-naphthyl-para-phenylenediamine are milled together for 15 to 20 minutes on chilled rolls. The mixture is then placed in a steam-jacketed Werner-Pfleiderer mixer and 400 parts of alcohol and 20 parts of a peptizing agent in the form of the magnesium salt of tri-isopropyl naphthalene sulphonic acid are added. After the dispersion has been brought up to about 130° F., 350 parts of alcohol are added as the dispersing process continues.

Any colloidal materials which swell or are soluble in the polar liquids may be used as the swellable colloidal material to be associated with the rubber in accordance with this invention. The cellulose esters, the prolamines, certain gums such as Loba gum, and the polymerized vinyl acetate and polyvinyl acetal resins are good examples of such colloidal materials, but persons skilled in the art will recognize that these are merely representative of a large class of materials which have a tendency to swell or dissolve in the polar organic solvents.

The "Loba" gum referred to in the specification is a natural resin belonging to the Manila class. As showing the nature of this resin, the following is quoted from "Natural Resins," published by "American Cyanamid & Chemical Corporation," 30 Rockefeller Plaza, New York city, page 25:

"The Manila Lobas are half-hard resins from *Agathis alba*, and are botanically related to the Pontianaks, Boeas, and the soft Manilas.
* * *

"Manila Lobas show a specific gravity of 1.07–1.08, a refractive index of 1.538–1.540, a direct acid number of 110–141, an indirect acid number of 134–155, a saponification number of 160–170, a softening point of 88°–91° C. (190.4°–195.8° F.), a melting point of 114°–120° C. (237.2–248° F.), and an iodine number of 68–130.

"Manila Lobas are soluble in anhydrous alcohol, butyl alcohol, denatured alcohols, isopropyl alcohol, methyl alcohol, cellosolve, cellosolve acetate, amyl acetate, ethyl acetate acetone, and ethyl ether. They are partly soluble in coal tar solvents—toluol, benzol, etc., partly soluble in carbon tetrachloride, but insoluble in petroleum hydrocarbons and turpentine."

Use of the prolamines as swelling agents constitutes a special preferred form of our invention. These complex substances give excellent dispersions whether used alone or in combination with other swellable colloids. They greatly increase the ease and speed of dispersion, and altogether behave in such a manner that we are inclined to believe they contain some substance which acts as a dispersing agent, as well as the swellable colloidal material. Prolamines which may be employed may be those obtained from various grains, including maize, wheat or barley. Gliadin, the prolamine from wheat, or hordein from barley may be used for this purpose, but it is preferred for commercial purposes to use zein, the prolamine from maize, since it is very considerably cheaper than the other substances. Since the prolamines are insoluble in anhydrous solvents, small amounts of water are added to the dispersing medium when a prolamine is to be employed as the swellable colloid.

Dispersions having the following compositions may be made according to the process of Examples 1 and 2.

*Example III*

| | Parts |
|---|---|
| Rubber (unmilled smoked sheets) | 600 |
| Sym. di-beta-naphthyl-para-phenylenediamine (anti-oxidant) | 7.8 |
| Zein | 300 |
| Water | 100 |
| Isopropyl alcohol | 950 |
| Magnesium salt of tri-isopropyl naphthalene sulphonic acid | 25 |

The water and 400 parts of alcohol, containing the dispersing agent, are added to the rubber-zein mixture, after which the remaining 550 parts of alcohol are added in several increments as the dispersing process proceeds. There results an excellent dispersion of fine particle size, which may be further diluted with 1125 parts of alcohol.

*Example IV*

| | Parts |
|---|---|
| Rubber (unmilled smoked sheets) | 400 |
| Zein | 200 |
| Anti-oxidant | 5.2 |
| Water | 100 |
| Oleic acid | 26.8 |
| Ammonia (28%) | 26.8 |
| Magnesium salt of tri-isopropyl naphthalene sulphonic acid | 8 |
| Methyl ethyl ketone | 700 |

The dispersion may be further diluted with 400 parts of a solution containing 12.5% of water and 87.5% of methyl ethyl ketone.

When the material which has been described above is used as the base of a container-sealing composition, the control of the amount of material which is applied to the closure is secured by a mutual adjustment of air pressure applied to the compound, the diameter of the nozzle, and the viscosity of the composition. Consequently, it is usually necessary to adjust the viscosity of the composition and this may be done by adding an agent which swells in the continuous phase. For viscosity adjustment, it is preferred to use a high viscosity ethyl cellulose. This is dissolved in a further quantity of the same polar compound chosen for the continuous phase and is added to the dispersion in such varying amounts as may be required to secure the desired viscosity.

The very high pressures which are exerted on the dried compound in the double seaming operation makes it frequently necessary to reinforce the compound with an inert filler. When reinforcement is necessary, finely pulverized substances are added such as zinc oxide, a magnesium aluminium silicate, sold under the registered trade-mark "Asbestine," titanium dioxide, magnesium carbonate, calcium carbonate, or barium sulphate. These substances may be added to the completed dispersion and stirred until a uniform suspension is secured, or they may be milled into the rubber before the step of dispersion. The amount varies, depending upon the degree of resistance required up to a maximum of approximately 35% of the combined dry weight of the rubber and the colloid.

*Example V*

A composition suitable for use in sealing containers may be made from the isopropyl alcohol dispersion of Example III by adding to 770 parts of the dispersion 150 parts of isopropyl alcohol and 50 parts of a 6.7% solution of ethyl cellulose in isopropyl alcohol.

*Example VI*

A filler such as zinc oxide may be incorporated into a container sealing composition by the following method.

| | Parts |
|---|---|
| Rubber (unmilled smoked sheets) | 600 |
| Anti-oxidant | 7.8 |
| Zein | 150 |
| Zinc oxide | 320 |
| Magnesium salt of tri-isopropyl naphthalene sulphonic acid | 10 |
| Water | 50 |
| Ethyl alcohol | 1350 |

The rubber mix containing zinc oxide and zein is dispersed according to the method of Examples I and II. The dispersion is then converted into a container sealing composition by adjusting the viscosity according to the following formula:

| | Parts |
|---|---|
| Rubber dispersion | 445 |
| Ethyl alcohol | 250 |
| Ethyl cellulose solution 8.1% | 355 |

As we have pointed out above, the properties of compounds such as the lower alcohols, ketones, and acids which contain a strongly polar terminal group and have a small number of carbon atoms in the molecule, are determined by the terminal group. Such compounds are polar and do not dissolve rubber. As the number of carbon atoms increases, the polar nature of the compound progressively disappears and the compound eventually becomes a rubber solvent. Our invention is concerned primarily with the use of polar compounds which are non-solvents for rubber.

In this progressive change of properties there is a certain borderline region in which the compounds partake of the nature of both polar and non-polar compounds, and exhibit some swelling effect on rubber. Substances within this range which are predominantly polar in behavior, i. e., cause swelling but not complete solution of the rubber, are suitable to be used as dispersing media according to this invention. For the sake of convenience, we include these compounds in the term "polar organic liquid medium which is a non-solvent for rubber."

An excellent example of the progressive change of properties described above is afforded by the behavior of the series ethyl acetate, propyl acetate, butyl acetate. Ethyl acetate is a typical polar compound, and a good dispersing medium for rubber. Butyl acetate is a rubber solvent and forms an ordinary rubber cement. Propyl acetate represents the borderline between these two. It behaves like a polar compound in that it dissolves cellulose esters, and like a non-polar compound in that it swells rubber. Its polar properties predominate, and it can be used as a dispersing medium for rubber.

The use of polar organic dispersing media which have a slight swelling effect on rubber has been found to offer certain advantages, namely, greater ease of dispersion and increased viscosity of the finished compound. Both effects probably result from a softening and gelation of the rubber substance due to the action of the rubber solvent. This modification of the invention has been found particularly useful in making large batches of dispersion in actual commercial practice where the resultant saving of power in the dispersing process is considerable. The viscosity increase is of particular importance in manufacturing dispersions which are to be used as container sealing compositions, since the viscosity of the dispersion would otherwise have to be adjusted by the addition of solutions of cellulose esters or other thickening agents.

This modification of our invention may be carried into effect by the use, as dispersing media, of the above-described borderline solvents which are predominantly polar compounds, but which also have a slight swelling action on rubber. Phenyl cellosolve is such a compound, and its use as a dispersing medium for rubber is illustrated by the following example.

Example VII

| | Parts |
|---|---|
| Rubber | 400 |
| Anti-oxidant | 5.2 |
| Zein | 200 |
| Water | 134 |
| Phenyl cellosolve | 930 |

The process of dispersion is found in this case to proceed with exceptional ease, and a heavy viscous dispersion results. This may be further diluted by the addition of water and phenylcellosolve: for example, 67 parts of water and 465 parts of phenylcellosolve gave a freely flowing dispersion suitable for commercial use.

Alternatively, the benefits of greater ease of dispersion and increased viscosity may be obtained by the addition of rubber solvents to polar organic dispersing media which would otherwise have no solvent effect on rubber. For example, a mixture of 70% ethyl alcohol and 30% benzol is an excellent solvent for zein if small quantities of a fatty acid such as oleic acid or lactic acid are added. This solvent mixture has been used as a dispersing medium for rubber, and has been found to give the advantages which would be expected because of the presence of rubber solvent.

If desired, rubber solvents in amounts sufficient to cause gelation but not actual solution of the rubber, may be added to an already prepared dispersion in place of the usual viscosity increasing agents such as ethyl cellulose.

By the term "rubber" in the specification and in the appended claims, we intend to include all rubber-like materials, either natural or synthetic.

While the preferred embodiments of the invention have been set forth above, it will be apparent to one skilled in the art that many variations therein may be made without departure from the spirit of the invention. The invention, accordingly, includes all modifications and equivalents falling within the scope of the appended claims.

We claim:

1. Process for dispersing rubber in a polar organic liquid medium which is a non-solvent for rubber, said process including the steps of masticating the rubber with a colloidal material which is swellable in the polar organic liquid, adding the polar organic liquid, and continuing the mastication until the phases invert and the rubber becomes dispersed as the internal phase in the polar organic liquid medium.

2. Process for dispersing rubber in a polar organic liquid medium which is a non-solvent for rubber, said process including the steps of masticating the rubber in the presence of a colloidal material which is swellable in the polar organic liquid, and a dispersing agent, adding thereto the said polar organic liquid and continuing mastication until the rubber becomes dispersed as the internal phase in the polar organic liquid medium.

3. The process for dispersing rubber in a polar organic liquid medium which is a non-solvent for rubber, said process including the steps of masticating the rubber in the presence of a colloidal material which is swellable in the said polar organic liquid, adding thereto the said polar organic liquid containing a dispersing agent for the rubber, and continuing mastication until the rubber becomes dispersed in the liquid medium.

4. The process of dispersing rubber in alcohol which includes masticating the rubber in the presence of a prolamine, adding thereto a water-alcohol mixture in which the prolamine is soluble, and continuing mastication until phase reversal takes place and the rubber becomes dispersed as the internal phase in the alcohol.

5. A container sealing composition which includes a dispersion of rubber in ethyl alcohol, ethyl cellulose dissolved in the alcohol, and a filler.

6. A polar organic liquid dispersion of crude rubber and prolamine said liquid being a non-solvent for rubber.

CHARLES H. EGAN.
ARTHUR J. LEYDON.
JOSEPH P. FAHEY.

REFERENCES CITED

The following references are of record in the file of this patent:

UNITED STATES PATENTS

| Number | Name | Date |
|---|---|---|
| 1,392,849 | Plauson | Oct. 4, 1921 |
| 1,652,926 | Blocker et al. | Dec. 13, 1927 |
| 1,793,983 | Whittelsey | Feb. 24, 1931 |
| 1,906,437 | Trumbull | May 2, 1933 |
| 1,938,011 | Faldini | Dec. 5, 1933 |
| 2,047,977 | McGowan | July 21, 1936 |
| 2,082,278 | Ferguson | June 1, 1937 |
| 1,589,330 | Sheppard et al. | June 15, 1926 |
| 1,916,421 | Hazell | July 4, 1933 |
| 2,265,777 | Merrill | Dec. 9, 1941 |

FOREIGN PATENTS

| Number | Country | Date |
|---|---|---|
| 239,048 | Great Britain | Sept. 3, 1925 |
| 444,375 | Great Britain | Mar. 19, 1936 |